US007963439B2

(12) United States Patent
Brown

(10) Patent No.: US 7,963,439 B2
(45) Date of Patent: Jun. 21, 2011

(54) METHOD AND APPARATUS FOR VENDING A CONTAINERIZED LIQUID PRODUCT UTILIZING AN AUTOMATIC SELF-SERVICE REFILL SYSTEM

(76) Inventor: Laurie J. Brown, Shoreview, MN (US)

( * ) Notice: Subject to any disclaimer, the term of this patent is extended or adjusted under 35 U.S.C. 154(b) by 0 days.

(21) Appl. No.: 12/627,072

(22) Filed: Nov. 30, 2009

(65) Prior Publication Data

US 2010/0072273 A1 Mar. 25, 2010

Related U.S. Application Data

(63) Continuation of application No. 11/461,446, filed on Jul. 31, 2006, now Pat. No. 7,624,922, which is a continuation-in-part of application No. 11/166,624, filed on Jun. 23, 2005, now Pat. No. 7,083,093, which is a continuation of application No. 10/873,511, filed on Jun. 21, 2004, now abandoned, which is a continuation of application No. 09/944,994, filed on Aug. 30, 2001, now Pat. No. 6,772,944, which is a continuation-in-part of application No. 09/396,574, filed on Sep. 15, 1999, now Pat. No. 6,578,763.

(51) Int. Cl.
*G06F 7/08* (2006.01)

(52) U.S. Cl. ........................................ 235/381; 235/383

(58) Field of Classification Search .................. 235/381, 235/383, 462.01

See application file for complete search history.

(56) References Cited

U.S. PATENT DOCUMENTS 4,567,926 A * 2/1986 Lichfield et al. .............. 141/332
6,504,481 B2 * 1/2003 Teller .......................... 340/572.1
7,066,215 B1 * 6/2006 Hewlitt et al. .................... 141/9
7,284,576 B1 * 10/2007 Yacko et al. .................... 141/95

* cited by examiner

*Primary Examiner* — Ahshik Kim

(74) *Attorney, Agent, or Firm* — Albert W. Watkins

(57) ABSTRACT

A method and apparatus for vending a containerized fluid includes placing a machine-readable indicia on the container identifying the base fluid. The container may be filled and then distributed or distributed prior to filling through various distribution channels to consumers. When a consumer wishes to fill or re-fill the container, the consumer places the container adjacent a reader that interprets the indicia to identify the base fluid to be dispensed. A dispenser then fills the container through a movable fill probe that elevates as the liquid within the container rises. In some embodiments, and prior to filling, the dispenser apparatus may also query the consumer about options are provided at the time of dispensing for further dispensing various optional ingredients, including scents, flavors, colors, nutritional supplements or other additives together with the base product. In further embodiments, the dispenser may also print discount tickets or coupons that may discount the purchase of the containerized fluid or other promotional merchandise. The machine-readable indicia may include affiliate codes that permit crediting or compensating various affiliates in relation to the container filling.

5 Claims, 3 Drawing Sheets

METHOD AND APPARATUS FOR VENDING A CONTAINERIZED LIQUID PRODUCT UTILIZING AN AUTOMATIC SELF-SERVICE REFILL SYSTEM

CROSS REFERENCE TO RELATED APPLICATIONS

This application is a continuation of co-pending U.S. application Ser. No. 11/461,446 filed Jul. 31, 2006 which is presently allowed and scheduled to issue as U.S. Pat. No. 7,624,922 on Dec. 1, 2009, which is a continuation-in-part of U.S. application Ser. No. 11/166,624 filed Jun. 23, 2005 and now issued U.S. Pat. No. 7,083,093, which is a continuation of U.S. application Ser. No. 10/873,511 filed Jun. 21, 2004 and now abandoned, which is a continuation of U.S. application Ser. No. 09/944,994 filed Aug. 30, 2001 and now issued as U.S. Pat. No. 6,772,944 which was granted Aug. 10, 2004, which is a continuation-in-part of U.S. application Ser. No. 09/396,574 filed Sep. 15, 1999 and now issued U.S. Pat. No. 6,578,763 which was granted Jun. 17, 2003, the contents of each which are incorporated herein by reference in entirety.

BACKGROUND OF THE INVENTION

1. Field of the Invention

This invention pertains to dispensers generally, and more particularly to dispensers that are controlled responsive to indicia upon a fluid receptacle to dispense a particular product mixture.

2. Description of the Related Art

Various commercial establishments, including supermarkets and many other diverse outlets, sell a wide variety of fluid products in various containers. A specific example of a fluid product is a liquid laundry detergent sold in relatively large plastic containers having a screw-type cap or closure. Consumers of such liquid products frequently discard the containers after using the contents. The discarded empty containers then migrate into a waste disposal area such as a landfill.

If an alternate system were used whereby a customer would bring back the empty original container to the commercial establishment for refilling the container, using a user friendly method as will be described below in connection with the present invention, then the following benefits may be attained:

1. The commercial establishment can profitably vend or sell the liquid product for refilling at a price significantly lower than the original sales price. The lower price will financially motivate the customer to return with the empty container for refilling. The commercial establishment will use relatively low-cost bulk quantities of the liquid product for refilling, which helps to maintain a strong profit margin for the commercial establishment.

2. Refilling and reuse of containers breaks the cycle of "use and discard", which keeps empty containers out of the landfills with obvious benefit to society.

3. Delivery of bulk product directly to consumer illustrated herein requires less handling labor and shipping-type packaging materials than traditional methods, further reducing cost and landfill waste production.

4. Bulk packaging reduces the retail shelf space required for display/delivery of product to a customer. Where consumer packaging tends to be relatively inefficient at using precious retail shelf space, bulk dispensers illustrated herein offer space/product ratio improvement.

5. Appropriate dispensing options in accord with the present invention enable dispensing a nearly unlimited combination of base and optional ingredients into a consumer's container. The more options presented to a consumer in the traditional prepackaged environment, the more precious retail shelf space that is required. Consequently, in the prior art the consumer's product choices were extremely limited.

Thus the present invention provides financial benefits to both commercial establishments/vendors and consumers/customers, while also facilitating a reduction in solid waste as a benefit to society and enabling a broader selection of product choices to meet a particular customer's needs.

U.S. Pat. No. 4,929,818 to Bradbury, et al., discloses a method and apparatus for vending a containerized product on multiple occasions. In the Bradbury patent, a customer initially purchases a fluid-filled container with a bar code that indicates the price of the container. Upon emptying the container, the customer returns to the store and refills the container at a refill station. The refill station modifies the bar code on the container to indicate that the container has been refilled. Thus, when the customer checks out, he or she is only charged for the refill, and not the container. A major disadvantage of the system disclosed in U.S. Pat. No. 4,929,818 is that it does not read the bar code at the time of filling, limiting the Bradbury et al invention to a single product. Nevertheless, it still requires a relatively complex apparatus for modifying the bar code on the container to indicate that the container has been refilled. This complexity has been avoided in the present invention, while simultaneously enabling a much more diverse range of products to be dispensed.

SUMMARY OF THE INVENTION

In broad terms, the present invention provides a method of vending a fluid product to a customer utilizing an original container. At the time of the original purchase of the original container, the container has thereon a machine-readable indicia such as a bar code or the like indicative of the product and of the original sales price of the container as filled with the product. After the original container has been emptied of the product, then the invention provides for multiple refillings of the product into the original container. The machine-readable indicia on the container is utilized to actuate the refilling of the container and, after each refilling of the container, the method dispenses to the customer a discount coupon to be presented to the vendor's check-out station, together with the refilled container, whereby the price charged to the customer by the vendor is the original sales price associated with the bar code, less the value of the discount coupon.

Another important aspect of the invention is that the basic concept can be expanded to provide for the vending of a plurality of containerized products respectively into a plurality of original refillable containers from a single dispensing station. For this case, each of the original refillable containers for a plurality of originally vended products, each of which may be of different diameters or shapes, has a unique machine readable indicia thereon indicative of the liquid product in the original refillable container, and the original sales price prior to the first refilling. For each refilling of a selected refillable container with the matching product, a discount coupon is dispensed to the refill customer which may be presented to the vendor's customer checkout station, together with the matching refilled container.

Another important aspect of the invention is that the fluid refilling method includes a vertically oriented filling pipe or probe having an outlet and being positioned over a filling opening in an original container. The probe is adapted to be vertically moveable with respect to the original container and is sized to freely enter the filling opening. The filling probe is inserted into the refillable container through the opening, until the outlet is adjacent the bottom of the refillable container. Next, the container is filled with a preselected volume of the fluid product, and, most preferably, the dispensing tip is progressively raised as the container is filled. This inventive feature prevents foaming as the container is being filled, since the liquid is not exposed to the air during entry into the container. Potential splashing and the probability for spills are also eliminated. The present invention thereby avoids consumer contact with messy and potentially hazardous substances which might otherwise result from overflow, suds, spills and splashes.

Yet another important advantage of the present invention is the preservation of brand identity and loyalty with the container, through multiple refills. A consumer cannot fill a container without the original label, nor can the product be scanned at check-out. Consequently, the product within the container is always properly labeled with the original label, thereby ensuring brand identity remains with the container through each refill. Furthermore, the customer has price incentive to maintain brand loyalty, since the refill will always be discounted relative to a new competitor product. Finally, any special instructions, hazards or chemical ingredient lists will also be preserved, in the event of an accidental poisoning or the like, thereby preserving the promotion of safe use of the product.

Another aspect of the invention is to provide an additional marketing function in connection with either single product or multiple product dispensers discussed herein, by dispensing to the refill customer, at the time of dispensing a discount coupon, at least one additional coupon or promotional message.

Another advantage of the present invention is that it can be linked to an inventory control management system whereby data is collected on the volume, on a product-by product basis, of sales of fluid products to permit a supplier to automatically restock products at the appropriate time, and/or permit the retailer to automatically order from the supplier at the appropriate time.

Yet another advantage of the present invention is the ability to include affiliate codes on the container label, for crediting or compensating an affiliated entity with refills associated in some way with that affiliate.

A further advantage of the present invention is the ability to provide custom scents, flavors, nutritional supplements and the like to an otherwise standard product, without detriment to the functionality of the product and with only slightly greater complexity and space required within the dispensing machine.

Yet a further advantage is the increased visibility obtained by a product packaged and sold through the novel dispenser, since the monitor is substantially more visible with display screen when contrasted to the many bottles along a store shelf. Consequently, precious visual attraction at a retail location is obtained by the preferred embodiment over conventional packaging.

In one basic manifestation, the invention is an apparatus for commercial vending of a plurality of fluid products into individual ones of discrete fluid receptacles suitable for holding, transporting and consuming fluid products. The individual ones of discrete fluid receptacles have machine-readable indicia thereon indicative of one fluid product for an individual one of the discrete fluid receptacles. The fluid product is selected from a plurality of fluid products available from the vending apparatus. A support housing holds containers to be at least one of filled and refilled with fluid. A control system is responsive to indicia on the containers to control the ratio of at least two fluids mixed for deposition in the containers. The control system interfaces with at least an operator control interface which allows operator entry of at least one of selections, responses, control commands, and options relative to the operation of the control system. Further defining the invention are various features including ingredient lot tracking; a presentation through the operator control interface comprising at least one additional ingredient selected responsive to indicia and compatible with the fluid product, and a receiver through said operator control interface through which the operator may select or reject the at least one additional ingredient for mixing with the at least two fluids mixed for deposition; and a remote communications link through which at least one of an operation or status of the apparatus may be communicated.

BRIEF DESCRIPTION OF THE DRAWINGS

Other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
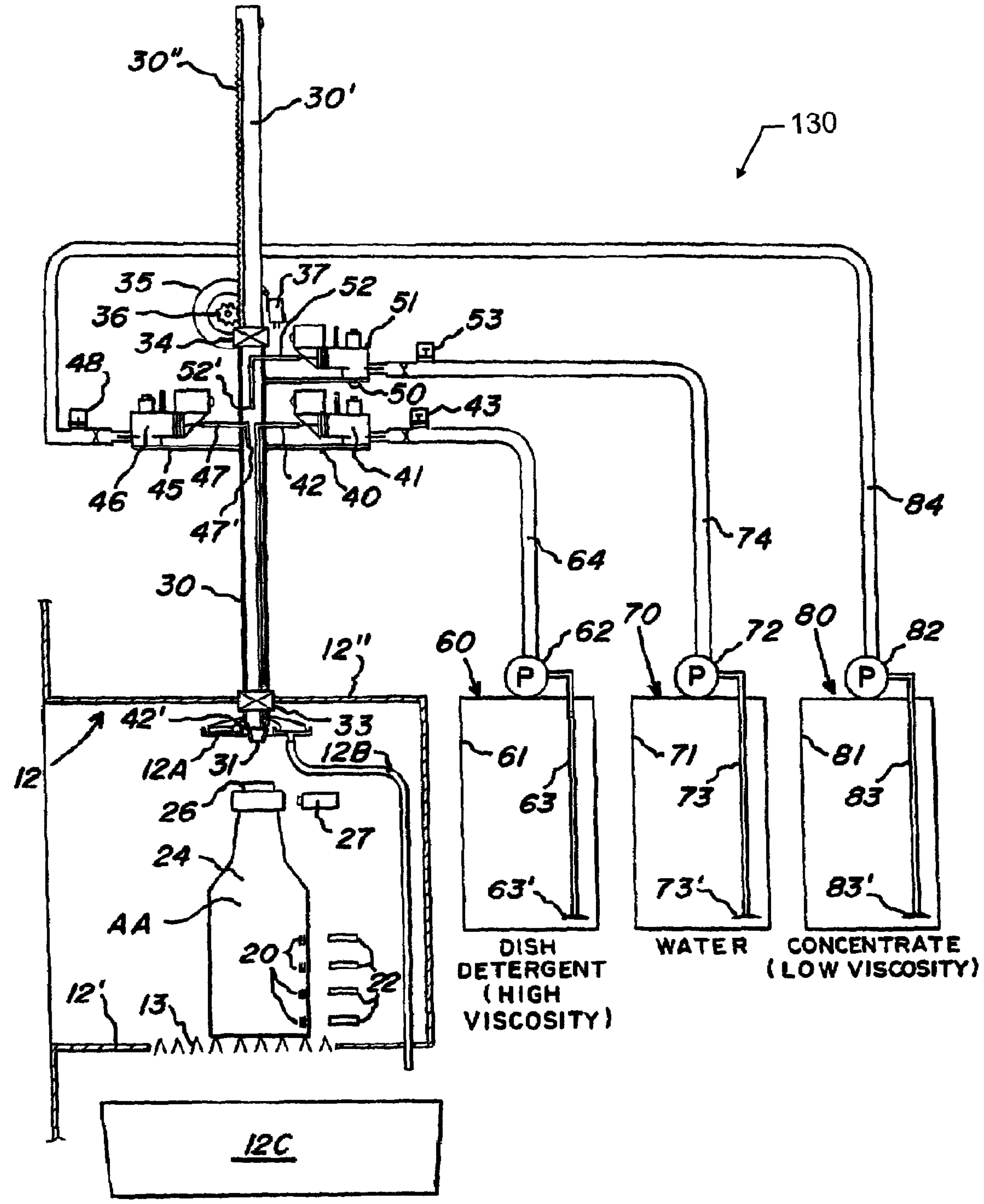
FIG. 1 is a schematic representation of a refill station designed in accordance with the teachings of the present invention.
Figure 2:
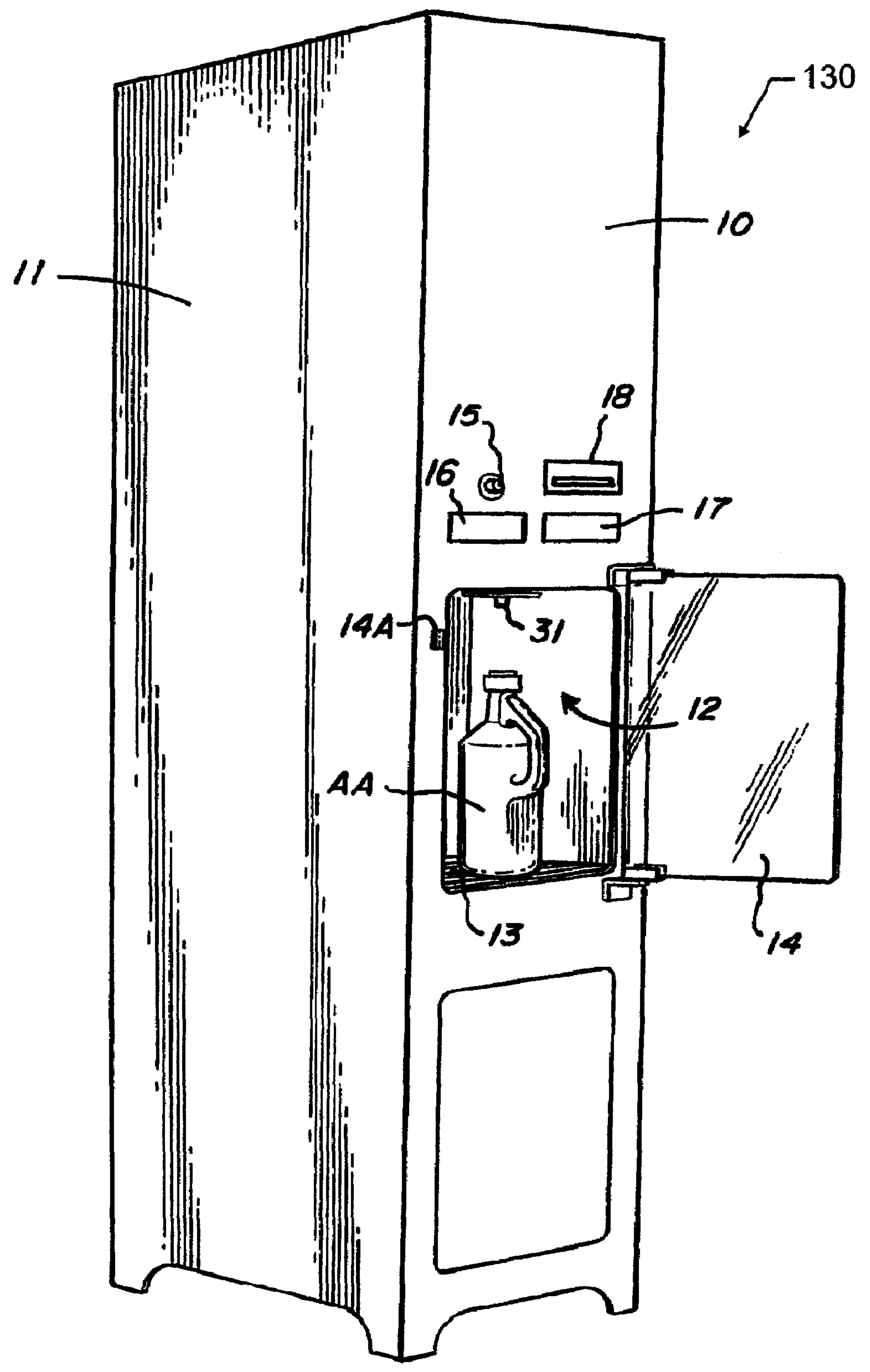
FIG. 2 is a perspective view of a refill station cabinet designed in accord with the teachings of the present invention.

FIGS. 1 and 2 depict an apparatus for vending at least one fluid product, such as a liquid cleaning product. Other types of products are contemplated herein, including but not limited to shampoos, conditioners, hand soaps, lotions, water based beverages, water, "smart foods" that include custom blends of nutritional supplements within the food or beverage, and the like. In fact, any material which is sufficiently fluent, whether solid, liquid or gaseous, may be dispensed through an apparatus such as refill station 130, provided each of the components described herein below are designed to accommodate the material.

Self-service refill station 130 is designed to reduce cost and waste by reusing a consumer's bottle or other fluid container AA. It should be understood that the concepts of the present invention are applicable for vending two or more different proprietary fluid products, as will be explained herein below. Thus, for one vending scenario, a consumer purchases one of ten different proprietary cleaning products. When container AA is empty, the consumer brings it to a store that has a refill station 130. Container AA is inserted in chamber 12 and refill station 130 reads a code 20 on the label to identify the type and quantity of cleaner. Refill station 130 then blends and dispenses the same product that is identified by code 20. For this scenario, the products consist of one of five different concentrates dispensed selectively in full concentration or mixed with varying quantities of filtered water.

Container AA is preferably manufactured from a durable translucent plastic with a removable cover, though the specific construction, materials and geometry of container AA is not critical to the performance of the invention. The shape of container AA is however selected most preferably to facilitate proper centering and orientation within fill chamber 12. Additional considerations are that code or indicia 20 be durable, colorfast, and positionable correctly and consistently toward code reader 22, to enable accurate readings to be taken. The footprint and diameter of varying capacity containers is preferably similar enough so as to facilitate centering under a fill-spout such as fill-probe 31. The mouth of container AA must be sufficiently wide for ease of receiving fill-probe 31.

One implementation for the foregoing that provides simple product handling by the consumer is to provide a turntable within fill chamber 12 to support container AA. The turntable may then be automatically rotated after the consumer has closed chamber 12, allowing container AA to be scanned for bar codes irrespective of orientation. Where container AA is round, such a turntable can be round and have concentric circles to help center varying sizes of bottles, while allowing a central drain. Other shapes and configurations will be apparent to those skilled in the art upon a reading of the present disclosure.

Referring to FIG. 2, a refilling cabinet is depicted as a floor-supported refill station 130 having a front panel 10 and a side panel 11. Fill chamber 12 extends inwardly from a midsection of front panel 10 and has a perforated bottom or drain shelf 13 for receiving and supporting an empty bottle or container AA. Door 14 may preferably be provided for closing chamber 12 to prevent a customer or operator from accidentally interfering with the operation of refill station 130. In this case, a door latch and interlock 14A on front panel 10 holds or retains door 14 and also is an element of the filling control circuit. A start button 15, discount coupon dispensing means 18 and one or more visual message means 16 and 17 of various or appropriate size and electronic construct, such as LED, LCD, CRT or other known display or messaging devices are also provided on the front panel 10 of the cabinet.

In an alternative embodiment to the use of start button 15, and preferred for many consumer applications, door latch and interlock 14A is used instead of start button 15. In this embodiment, the initiation of refill station 130 occurs immediately upon closure of door 14. In such case, appropriate logical control is provided to ensure proper sequential checks prior to dispensing, including but not limited to the closure of interlock 14A, the detection of a container having appropriate label and proper position, proper travel of probe 30 to the bottom of container AA, and determination that container AA is not already full. The proper travel of probe 30, which might for exemplary purposes be detected by the activation of a travel limit switch, sensor or other suitable device, will ensure that a cap was not blocking travel of the probe, will ensure that the bottle is properly oriented (since a tilted bottle would interfere with the probe travel), and will ensure that the probe is being moved appropriately by the drive.

Referring to FIG. 1, the chamber 12 is depicted as having a lower surface 12' with its integral perforated section 13 and an upper or top surface 12". Empty container AA is depicted positioned resting on surface 13 with a neck-down portion 24 terminating in an opening 26 at the top thereof. An overfill sensor 27 is fixed to chamber 12 and is positioned adjacent top 26 of container AA. Overfill sensor 27 may serve additional functions, or these functions may separately be implemented in additional sensors, including detection of a closed bottle in need of cap removal, and detection of foam within container AA. While many manifestations are envisioned, where container AA is relatively translucent or transparent, and a cover or cap is not, optical detection of the blocking of light transmission through the top region will identify the presence of a cover or cap. Similarly, undesirable foam that may form during the filling process will also produce substantial blockage of transmission, and will in many cases produce substantial optical reflection. Detection of either blockage or reflection may be used to identify undesirable foaming.

Container AA has machine-readable indicia 20 thereon. For an example as depicted, there are four separate indicia marks 20 which are adapted to be sensed by four sensors 22 attached to the chamber 12 for the purpose of identifying the type and quantity of the liquid product originally vended in container AA. Nevertheless, a myriad of known machine-readable indicia and sensors are known and contemplated herein, including but not limited to bar code readers and other optical sensors, magnetic sensors, and so forth.

One exemplary alternative machine-readable indicia that is gaining in popularity more recently is the Radio-Frequency Identification (RF ID) tag. The RF ID tag has been proposed to replace bar code readers and the like, since the tag may be embedded directly into a product or packaging, and so is both permanent and much more tamper-proof than a standard barcode. In addition, some tags provide limited electronic storage, in addition to the indicia. So, for exemplary purposes only and not limiting thereto, it is conceived herein that the tag may be used to store additional information, such as a count of the numbers of refills. With a modifiable indicia such as the RF ID tag, but not solely limited thereto, discounts or other promotions may be provided for every n refills, where n may be as little as every $2^{nd}$ refill up to any number sufficient to reasonably encourage the refill process.

For the present application, the machine readable indicia, whether bar code, RF ID tag, or other suitable indicia, may be implemented to identify either a generic or base product, or alternatively may provide a unique code for each individual container. The implications of each will be discussed herein below.

Figure 4:
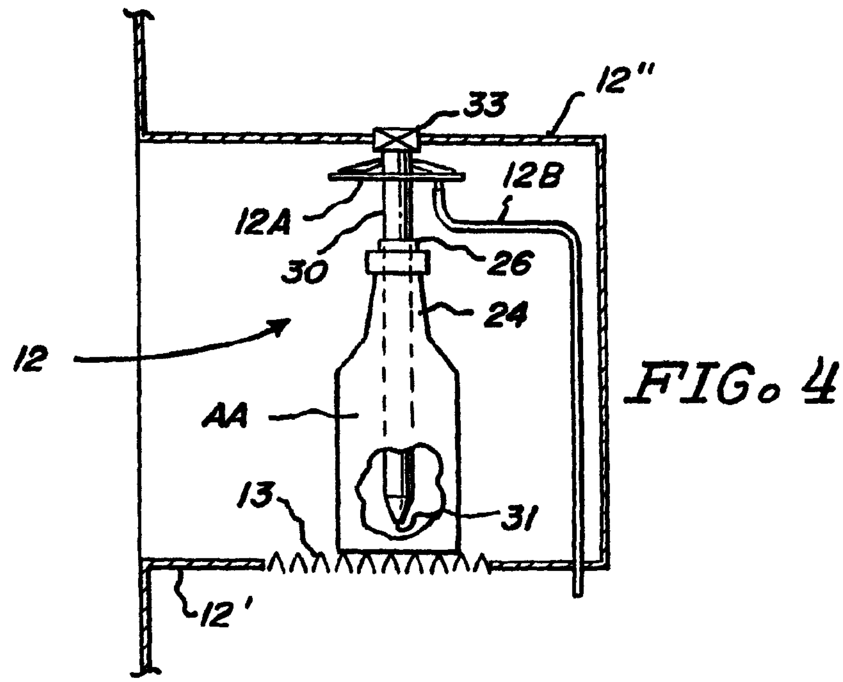
FIG. 4 is a partial view of the refill station of FIG. 1, with the filling pipe or probe 30 moved down and into container AA.

Fill-probe 30 is vertically positioned above container AA and is adapted in preparation for a fill cycle to be moved vertically from the position shown in FIG. 1 to the position shown in FIG. 4, with the spout of discharge end 31 of probe 30 as shown in FIG. 4 adjacent to the bottom of container AA. Thus, fill-probe 30 has an outside diameter preselected to permit insertion through top opening 26 of container AA and thence downwardly in. This arrangement facilitates refilling container AA with a minimum of foaming. In the preferred embodiment fill probe 30 will be raised up during dispensing, through a continuous motion, series of timed steps, or other suitable control to thereby ensure that only the tip of fill-probe 30 is contacting the liquid as the liquid level rises within container AA.

Fill-probe 30 is supported for the aforesaid vertical movement with respect to container AA by a pair of guide-bushings 33 and 34 shown in FIG. 1. The top (as shown in FIG. 1) portion of fill-probe 30 is identified by reference numeral 30' and has a longitudinally extending rack-gear 30" which is adapted to be engaged by a pinion gear 36 driven by a motor-slip-clutch means 35. Thus, when motor-slip-clutch 35 is energized in one sense it will cause the rotation of pinion gear 36 so as to drive the rack-gear 30" and thus fill-probe 30 downwardly as shown in FIG. 1 to the position shown in FIG. 4. A reverse energization of motor-slip-clutch 35 will retract fill-probe 30 to the position shown in FIG. 1.

Rigidly attached to fill-probe 30 are brackets 40, 45, and 50, on which are mounted suitable valve and flow control means 41, 46 and 51 respectively. Each of the units 41, 46 and

51 have a discharge conduit extending inside of the fill-probe 30. Thus, valve and flow control 41 has a conduit 42 extending into fill-probe and extending down to a discharge opening 42' adjacent the nozzle 31 of fill-probe 30. In the same manner, units 46 and 51 have conduits 47 and 52, terminating respectively in discharge ports 47' and 52' within fill-probe 30.

Flexible fluid lines 64, 74 and 84 are connected respectively to inlet means of the valve and flow control units 41, 46 and 51. In an alternative embodiment, valve and flow control units 41, 46 and 51 may be eliminated, and timing and level detection by overfill sensor 27 used to control the flow from particular bulk liquid containers such as containers 60, 70, 80. Additional safety may be provided through timing to ensure the machine does not run beyond reasonable limits.

Suitable pressure switches 43, 53 and 48 may optionally be connected to the flexible fluid lines 64, 74 and 84 respectively. The flexible fluid lines 64, 74 and 84 are connected to the output of suitable pumps 62, 72 and 82 respectively, which are associated with bulk liquid containers 60, 70 and 80 respectively.

The arrangement depicted in FIG. 1 is for a typical scenario where container 61 contains a dish-detergent having a high viscosity, container 71 contains filtered water, and container 81 contains a low-viscosity concentrate. Pump 62 has an inlet conduit 63 extending to the lower portion of container 61. The bottom of conduit 63 is identified by reference numeral 63'. Likewise, pump 72 has a conduit 73 with a lower end 73', and pump 82 has a conduit 83 with a lower end 83' extending to near the bottom of containers 71 and 81 respectively.

Within chamber 12 a collector 12A may optionally be provided, concentrically positioned about the lower end 31 of fill-probe 30 that functions to collect any errant fluid that might be on the outer surface of fill-probe 30. Errant fluid is collected, and then removed via a suitable tube 12B, adapted to discharge into a drain pan 12C.

When container AA is filled to the proper level as sensed by overfill sensor 27 or other flow measuring techniques, then a control system functions to stop pumps 62, 72, 82; to retract fill-probe 30; and to dispense at least one discount coupon at 18 for the customer. In some cases, for marketing reasons as an example, the machine may dispense, in addition to the discount coupon, another coupon relating to another product or promotion, or other marketing-related papers such as cleaning tips or the like to help promote affiliated products. It is contemplated herein that the selection of particular additional information to be printed may be provided either intermittently or continuously via a communications link with the machine, which may for exemplary purposes include a Local Area Network (LAN), a Wide Area Network (WAN), the Internet, through a modem, or through other suitable communications link. At the end of the communications link remote from the machine, a variety of devices may be used to provide suitable human interface, and may include not only computers but other communications devices, such as but not limited to cellular telephones and the myriad of so-called Personal Digital Assistants (PDAs). As will be apparent, such devices may be used not only for selection of information to print, but for one or more of the many other functions that can occur from a remote location.

In some additional instances, it may be desirable to print other pertinent information. While the present discussion will be understood to not be limiting, and that those reasonably skilled in the art upon a reading of the present disclosure will recognize other applications, the machine may for exemplary purposes also dispense stickers or labels that may contain expiration dates, lot numbers and the like. Where RF ID tags are used, these lot numbers, expiration dates and other pertinent information might preferably also be stored in the tag. In the event the customer failed to apply the label, the bottle would still include proper labeling through the tag for later verification. Most preferably, in such applications where lot numbers may be desired, there may also be a tracking or correlation either within the labels or through computer or other logging between dispensed product lot numbers or dispensing date and times with source ingredients lot numbers. In the unlikely event that a particular source ingredient is contaminated or recalled, the affected dispensed product lot numbers can also be identified for similar recall.

Another example of additional printed information involves the awarding of special prizes for promotional purposes. These prizes and promotions may be dispensed randomly at the machine, and the rate of such awards may be controlled either at the machine or via a communications link. While not limited thereto, the promotions may help to introduce new products, advertise grand openings, or for any other purpose to which the present invention may be suited and which is known or recognized in the marketing and advertising industries.

At the time of retraction of fill probe 30, and depending upon the particular configuration of contents that are being dispensed into container AA, it may be desirable to release a very small amount of water to rinse fill probe 30, thus preparing fill probe 30 to dispense other compositions with a minimum of cross-contamination. While this will most preferably be done at the completion of the fill cycle while container AA is still under probe 30, there may also be instances where the customer will first remove container AA and then probe 30 self-cleans.

Figure 5:
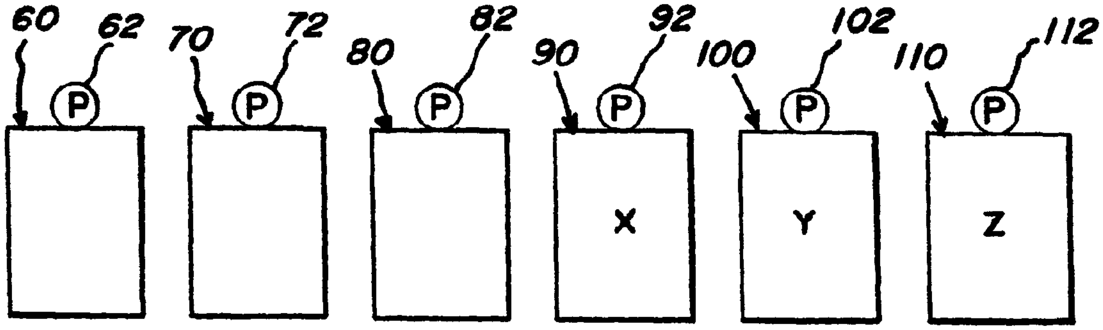
FIG. 5 is a view of an expanded refill station showing a total of six liquid storage containers for use, in one embodiment, with the apparatus of FIG. 1.

As indicated, the scenario depicted in FIG. 1 may be for a single fluid product, such as for exemplary purposes only and without limitation to the scope of the invention, a proprietary-cleaning product. FIG. 5 depicts an expansion of the arrangement shown in FIG. 1 where not only the bulk storage containers 60, 70 and 80 have been depicted but, in addition three additional bulk storage containers 90, 100 and 110, containing, respectively, products X, Y and Z. Containers 90, 100 and 110 comprise in part, respectively, pump means 92, 102 and 112. It will be understood that pumps 92, 102 and 112 each would be connected to fill-probe 30 through flexible fluid lines, valve and flow control units, and discharge conduits within fill-probe 30 similar to those associated with pumps 62, 72 and 82.

Thus, in operation, sensors 22 will respond to indicia 20 on container AA to uniquely identify the type and quantity of cleaner for that specific container. Then a control means, such as but not limited to a micro-controller, microprocessor or the like together with necessary relays or interface, will selectively actuate the appropriate pumps and any valve and flow control means. For the scenario depicted in FIG. 1 pumps 62, 72 and 82 are actuated, as are their respective valve and flow controls 41, 51 and 46. The valve and flow control means are controlled so as to provide the proper blending of the three liquids being pumped through the flexible fluid lines 64, 74 and 84 into fill-probe 30 and thence into container AA.

In addition to the type and quantity of product dispensed, the indicia 20 may also provide indication of the specific shape of container AA. In this case, the valve and flow controls 41, 46 and 51 may be controlled to dispense product at appropriate rate for the geometry of the bottle, and the extraction rate of fill probe 30 may also be controlled accordingly. If indicia 20 is not recognized, or is not appropriate, as aforementioned the fill process may be terminated and an indication of the problem may be provided, such as through displays 16, 17.

For a different proprietary product, e.g., X, the system control would cease utilizing liquid from tank 61, and commence using product from tank 90. While a particular number of tanks are illustrated herein, the invention is not so limited. Further features are contemplated herein, including the dispensing of a wide variety of fluent materials, and not solely limited to liquids. Further, the tanks are not limited to base materials such as detergents, but tanks may be provided containing a variety of scents, colorants, flavorings and nutritional supplements for edible compositions and the like. When optional ingredients are provided, one considered embodiment of the present invention is to use displays such as 16, 17 to poll a customer regarding the inclusion of these options. This may take the form of questions or option lists that determine whether, for exemplary purposes only, a particular cleaner should be unscented, pine, lemon, or the like. Based upon the customer's feedback, through switches, keypads or other known input devices, the particular ingredients may then be calculated and dispensed from each of the appropriate tanks.

Most preferably, the customer will be polled based upon the options available based upon the machine readable indicia. In other words, flavorings would not be appropriate for a hair product or carpet cleaner, but would be very appropriate for various foodstuffs that might be dispensed. In addition, relative strengths may also be polled. For exemplary purposes, the pine and lemon scents referred to herein above for cleaners might be either mild or strong, or even provided for on a sliding scale. The amount dispensed into the customer's container AA will thereby be proportioned based upon the customer's preferences. In these cases, it is also contemplated herein to store the customer's preferences, associated with a unique machine-readable indicia. The unique machine-readable indicia may even be the same bar code or RF ID tag, presuming that each container has a unique indicia. When the preferences are stored, either within the single refill station 130 or through a communications link, the customer may then be polled to use either stored preferences or a new blend. If the customer selects from one or more previously saved preferences, the customer may then obtain a potentially complex custom blend with just a few simple keystrokes or button presses. Consequently, after the initial selection of custom ingredients, subsequent refills are essentially as fast as the prior art water refill stations, and yet the customer is able to obtain a unique and custom blend suited specifically to their need or desire.

It will also be understood that the invention, shown in FIG. 2 as floor supported, may be configured for a support located above a floor such as a counter top, shelf or the like. The specific dimension, geometry or support of refill station 130 is not critical to the performance of the invention, though a preferred embodiment has been illustrated herein as required.

Figure 3:
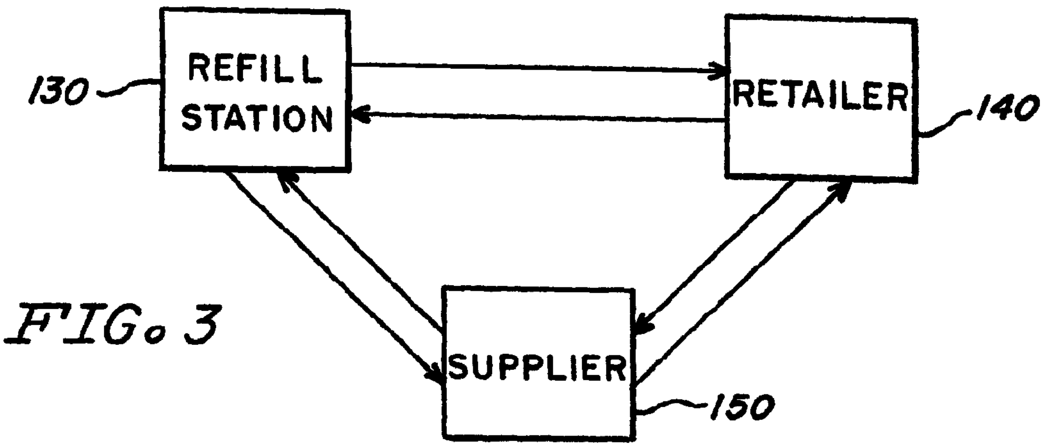
FIG. 3 is a block diagram of an inventory control system that may be used in conjunction with the present invention.

Another aspect of the invention is schematically shown in FIG. 3 wherein information generated at refill station 130 concerning the quantity of bulk liquids utilized is made available both to retailer 140 and to bulk supplier 150. This information can be very useful and cost effective for purposes of inventory control. In one mode, supplier 150 of bulk liquid products may receive the information from refill station 130 and, pursuant to prior agreement, automatically maintain adequate fluid supplies at refill station 130. Alternately, retailer 140 may maintain control over the ordering of supplies by receiving the information from refill station 130 and then, as appropriate, order from the supplier 150 additional stock for the system.

An added benefit that may be incorporated into the preferred apparatus and method is not only the monitoring of the ingredients, but also the calculation of prices and timing of billing. The calculations of price need not be based solely upon the amount of raw ingredients consumed for retail purchase, but may, for exemplary purposes, be based upon alternative calculations. As but one preferred illustration of a different price calculation, a consumer may consume a very small amount of concentrated cleaner for the production and refill of glass cleaner. In this case, the margins to the store are very high. In contrast, the amount of concentrate used in the production and refill of a much more concentrated heavy-duty cleaner is much greater. While it is contemplated in one method to bill the store based upon the amount of concentrate consumed, this may have an undesired side effect of encouraging the store to discourage or not even make available the heavy-duty cleaner. In consideration thereof, the store may alternatively be billed at some percentage or fixed price for each quantity and type of product filled. In this contemplated alternative, the machine may be used to sell product in a manner similar to consignment, where the store pays after the sales an agreed-upon amount based upon the quantity and type of product sold.

Yet another aspect of the invention derives from that illustrated in FIG. 3. Not only can information be exchanged between retailer 140 and bulk supplier 150, but similar information may also be exchanged between affiliated entities. These affiliates may include individuals, businesses and non-profit entities, for example, that may assist in one way or another with the production, promotion or actual sale of bulk products from refill station 130 or containers such as container AA. For example, a school or charitable organization may use either full or empty containers AA in a fund-raising activity. The particular organization is assigned a unique code or indicia 20, such as a combined bar code that identifies not only the desired contents for container AA, but also an affiliate code. Credits, financial or otherwise, are in this embodiment assigned to the affiliate at the time of each filling of container AA. In the case of a fund raising activity, the credits would most likely be financial payments made based upon the numbers and types of fills. Clearly, the application of this technique extends to many inter-organizational activities and affiliations. Sales associates, service bureaus, brand licensors, and others may all be accounted to through the present method. In addition, using displays 16, 17 to poll a customer permits refill station 130 to also poll a customer regarding affiliations that the customer may have, which can be used to similarly assign funds to the affiliate. Finally, the customer may be polled during later refills regarding continued charitable contributions to the same organization, or may be allowed to re-designate the funds.

In addition to the aforementioned myriad of possibilities that the communications links and displays present, the displays may also be used to conduct surveys. These may be as simple as asking the customer to rate their experiences, and customers can be encouraged to participate through the offering of incentives such as discount coupons or other incentives that may be printed directly at refill station 130.

As with all machinery, there will be times when refill station 130 needs testing, calibration, cleaning, and other service. In order to perform appropriate servicing, it is desirable not to allocate the consumption of source ingredients to either customers or a retail outlet. Instead, it is desired to separately account for the materials which are consumed for purposes other than resale. To accomplish this objective, a special code may be assigned to a bottle used solely be service personnel. The source materials which are consumed may then be allocated specifically to the testing, calibration, cleaning and repair functions.

While the preferred embodiment of the invention has been illustrated, it will be understood that variations may be made by those skilled in the art without departing from the inventive concept. Accordingly, the invention is to be limited only by the scope of the following claims.

I claim:

1. A method for commercial vending of a plurality of liquid products from a vending apparatus into individual ones of discrete fluid receptacles suitable for holding, transporting and consuming said liquid products, said individual ones of discrete fluid receptacles having machine-readable indicia thereon indicative of one liquid product for an individual one of said discrete fluid receptacles, said one liquid product selected from said plurality of liquid products available from said vending apparatus, comprising the steps of:

reading said machine readable indicia from an individual one of said discrete fluid receptacles;

determining amounts of individual ones of at least two diverse source ingredients needed from a plurality of ingredients available from said vending apparatus to formulate said one liquid product indicated by said machine readable indicia, responsive to said reading step;

dispensing said amounts of particular source ingredients into said individual one of said discrete fluid receptacles to thereby blend a liquid product therein from said at least two diverse source ingredients responsive to said determining;

saving a refill count to said machine readable indicia; and calculating a sales price responsive to said reading step and dependent upon said refill count.

2. A method for commercial vending of a plurality of liquid products from a vending apparatus into individual ones of discrete fluid receptacles suitable for holding, transporting and consuming said liquid products, said individual ones of discrete fluid receptacles having machine-readable indicia thereon indicative of one liquid product for an individual one of said discrete fluid receptacles, said one liquid product selected from said plurality of liquid products available from said vending apparatus, comprising the steps of:

reading said machine readable indicia from an individual one of said discrete fluid receptacles;

polling a customer for preferences from a plurality of ingredients available from said vending apparatus;

determining amounts of individual ones of at least two diverse source ingredients needed from a plurality of ingredients available from said vending apparatus to formulate said one liquid product in accord with a result of said polling;

dispensing said amounts of particular source ingredients into said individual one of said discrete fluid receptacles to thereby blend a liquid product therein from said at least two diverse source ingredients responsive to said determining;

saving said result of polling to said machine readable indicia;

retrieving said result of polling to said machine readable indicia from said individual one of said discrete fluid receptacles subsequent to said saving step; and filling said amounts of particular source ingredients into said individual one of said discrete fluid receptacles to thereby blend said liquid product therein from said at least two diverse source ingredients responsive to said retrieving.

3. The method for commercial vending of a plurality of liquid products of claim 2 wherein said determining step further comprises the step of selecting at least one fluid product selected from the group of detergents, scents, colorants, flavorings and nutritional supplements for edible compositions, the formulation of said filling being responsive to said retrieved result of polling.

4. A method for commercial vending of a plurality of liquid products from a vending apparatus into individual ones of discrete fluid receptacles suitable for holding, transporting and consuming said liquid products, said individual ones of discrete fluid receptacles having machine-readable indicia thereon indicative of one liquid product for an individual one of said discrete fluid receptacles, said one liquid product selected from said plurality of liquid products available from said vending apparatus, comprising the steps of:

reading said machine readable indicia from an individual one of said discrete fluid receptacles;

polling a customer for preferences from a plurality of ingredients available from said vending apparatus;

determining amounts of individual ones of at least two diverse source ingredients needed from a plurality of ingredients available from said vending apparatus to formulate said one liquid product in accord with a result of said polling;

dispensing said amounts of particular source ingredients into said individual one of said discrete fluid receptacles to thereby blend a liquid product therein from said at least two diverse source ingredients responsive to said determining; and surveying said customer subsequent to said dispensing.

5. The method for commercial vending of a plurality of liquid products of claim 4 further comprising the step of encouraging customer participation in said survey by providing said customer incentives at said vending apparatus.

* * * * *